United States Patent
Chandra et al.

[15] 3,699,140
[45] Oct. 17, 1972

[54] ORGANOSILICON COMPOUNDS

[72] Inventors: Grish Chandra; William J. Owen; Norman C. Lloyd; Bryan E. Cooper, all of Glamorgan, Wales

[73] Assignee: Midland Silicones Limited, Reading, England

[22] Filed: July 30, 1970

[21] Appl. No.: 59,701

[30] Foreign Application Priority Data

July 30, 1969 Great Britain..........38,158/69

[52] U.S. Cl...260/448.2 N, 260/46.5 R, 260/448.2 E, 260/448.2 D, 260/448.2 Q, 260/448.8 R
[51] Int. Cl..............................C07f 7/10, C07f 7/18
[58] Field of Search .260/448.2 N, 448.2 Q, 448.2 D, 260/448.2 E, 448.8 R

[56] References Cited

UNITED STATES PATENTS

| | | |
|---|---|---|
| 2,887,371 | 5/1959 | Bennett et al...260/448.2 N X |
| 3,249,630 | 5/1966 | Viehe..............260/448.2 Q X |
| 3,332,916 | 7/1967 | Hay.................260/448.2 Q X |
| 3,418,385 | 12/1968 | Skinner et al. ..260/448.2 E X |

*Primary Examiner*—Tobias E. Levow
*Assistant Examiner*—P. F. Shaver
*Attorney*—Robert F. Fleming, Jr., Laurence R. Hobey, Harry D. Dingman and Howard W. Hermann

[57] ABSTRACT

Organosilicon compounds, polymers and copolymers have been prepared containing acetylenic linkages between adjacent silicon atoms. The basic compounds are defined by the general formula $R'(R_2Si)_m(C\equiv C)-(C\equiv C)-(SiR_2)_nR''$ where R' and R'' are each H, halogen, hydrocarbonoxy or $-NQ_2$ as above defined, monovalent hydrocarbon or monovalent halogenohydrocarbon, $m$ is 1 to 4, $n$ is 0 to 4, R'' being H, alkyl, aryl or trihydrocarbylsilyl when $n$ is 0. The polymers can be defined by the unit formula $(OSiR_2-C\equiv C-C\equiv C-SiR_2-)$ and may be copolymers containing units of the formula $Q_aSiO_{(4-a)/2}$ where Q is monovalent hydrocarbon or halogenohydrocarbon and $a$ is 0 to 3. The novel compounds are useful as cross-linkers.

2 Claims, No Drawings

ORGANOSILICON COMPOUNDS

This invention relates to organosilicon compounds containing acetylenic unsaturation and to a process for the preparation of such compounds. The invention also relates to the use of the said organosilicon compounds as intermediates in the preparation of cyclic and polymeric materials.

According to the invention there are provided organosilicon compounds of the general formula

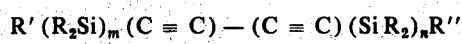

wherein R' and R'' each represent a hydrogen atom, a halogen atom, a hydrocarbonoxy radical or a radical of the formula —$NQ_2$, wherein each Q represents a hydrogen atom or a monovalent hydrocarbon radical, each R represents a hydrogen atom, a halogen atom, or hydrocarbonoxy radical, a radical of the formula —$NQ_2$, a monovalent hydrocarbon radical or a monovalent halogenhydrocarbon radical, m is an integer from 1 to 4 inclusive, n is zero or an integer from 1 to 4 inclusive, R'' being hydrogen, an alkyl radical, an aryl radical or a trihydrocarbylsilyl radical when n is zero.

In the general formula of the organosilicon compounds of this invention R' and R'' each represent a hydrogen atom, a halogen atom, preferably chlorine or bromine, a hydrocarbonoxy radical or a radical of the formula —$NQ_2$. The term hydrocarbonoxy as used herein means any radical of the formula R'''O— in which R''' is a radical composed of carbon, hydrogen and, optionally, oxygen, any oxygen present in R''' being in the form of either linkages. Examples of such hydrocarbonoxy radicals are methoxy, ethoxy, propoxy, phenoxy, methoxyethoxy and ethoxybutoxy. The preferred hydrocarbonoxy radicals are those which are the most readily hydrolyzable, that is, those having less than eight carbon atoms. Examples of —$NQ_2$ radicals which may be represented by R' and R'' are —$NH_2$, —NH·$CH_2$, —N($C_6H_5$)$_2$, —N·$CH_3$, ($CH_2$CH = $CH_2$) and —NY· ($CH_2$·$C_6H_5$). Where Q is a monovalent hydrocarbon radical it preferably has less than 19 carbon atoms.

The R radicals in the general formula may be any radical as exemplified for R' and R'' but, as hereinafter indicated, are preferably selected from monovalent hydrocarbon radicals and monovalent halogenohydrocarbon radicals, for example, alkyl and cycloalkyl radicals e.g., methyl, ethyl, propyl, hexyl, decyl, octadecyl and cyclohexyl, alkenyl radicals e.g. vinyl, allyl, and cyclohexenyl, aryl radicals e.g. phenyl, naphthyl, benzyl and tolyl and halogenoalkyl and halogenoaryl radicals e.g. chloromethyl, trifluoropropyl and bromophenyl. Most preferred from considerations of commercial availability are compounds in which the R radicals are selected from methyl and phenyl radicals.

Depending on whether n is zero or an integer the compounds represented by the general formula may contain one or two of the specified organosilyl radicals. When n is zero R'' should represent a hydrogen atom or an alkyl, aryl or trihydrocarylsilyl radical, for example the methyl, ethyl, butyl, octyl, tetradecyl octadecyl, vinyl, allyl, phenyl, benzyl, trimethylsilyl, dimethylphenylsilyl and dimethylvinylsilyl radicals. Preferably the said alkyl and aryl radicals and the hydrocarbyl radicals present in the trihydrocarbylsilyl group are those having less than 19 carbon atoms.

The compounds of this invention may be prepared by the reaction of (1) an acetylenic compound of the formula Li (C ≡ C) — (C ≡ C)X, wherein X represents a hydrogen atom or a lithium atom with (2) one or more silanes of the general formula R'($R_2$Si)$_p$Y, wherein Y represents a halogen atom, preferably chlorine, p represents an integer of from 1 to 4 inclusive and R and R' are as hereinabove defined.

The acetylenic compound (1) may be prepared by the reaction of a lithium alkyl with diacetylene in the appropriate molar proportions. This reaction is best carried out at temperatures below about 0° C and most preferably at temperatures below −20° C. Most conveniently the lithium acetylenic compound is prepared in situ in a suitable solvent just prior to contact with the silane reactant (2).

Reactant (2) may comprise a mixture of silanes of the general formula R'($R_2Si_p$Y. More preferably however a single silane is employed since this leads to a more completely refined product. Reactant (2) may be a mono-silane or a polysilane and may be, for example, dimethylchlorosilane, diphenylmethoxychlorosilane, triethoxybromosilane, aminodimethylchlorosilane, dimethylamino-(diphenyl)chlorosilane, n-octadecyl-methylmethoxybromosilane, methoxytetramethylchlorodisilane and methoxyethoxyoctamethylchlorotetrasilane.

The reaction between the lithium acetylene compound (1) and the silane (2) is best carried forward in the presence of one or more solvents for the reactants. Suitable solvents include, for example, benzene, toluene, xylene, n-hexane, diethyl ether, tetrahydrofuran and mixtures of two or more of these. The reaction may be performed at temperatures up to that at which the lithium acetylene compound decomposes, that is up to or above 25° C. A convenient temperature range for carrying out the reaction is from −10° to +5° C. The reaction can be initiated by mixing the reactants (1) and (2) at such temperatures or alternatively the reactants may be mixed at lower temperatures and the temperature of the reaction mixture allowed to increase to achieve the desired reaction rate.

Compounds of this invention in which R' and R'' and optionally R, are halogen atoms may also be prepared from the corresponding compound in which R' and, when present R'' and R, is an amine group e.g. the —N($CH_3$)$_2$ group or a hydrogen atom, by reaction of that compound with the anhydrous hydrogen halide, or with the halogen respectively. Alternatively they may be prepared by reaction of an acylhalide on the corresponding organosilicon compound wherein R', R'' and R are alkoxy radicals.

The presence of the R', R'', and optionally the R, functional radicals in the compounds of this invention render the compounds useful as intermediates in the preparation of other organosilicon compounds and as cross-linking agents for organosilicon and organic systems. Compounds wherein R' and optionally R'' and one or more of the R substituents are halogen or lower alkoxy may be hydrolyzed to form disiloxanes and linear of cross-linked polymers. Of particular interest are those compounds wherein m and n are each unity, R' and R'' are halogen atoms, preferably chlorine, and R is a monovalent hydrocarbon radical or monovalent halogenated hydrocarbon radical. Compounds of this type may be converted novel polymers comprising the repeating unit

by hydrolysis of the compound and condensation of the hydrolysis product. Similarly copolymers containing the specified unit may be obtained by the cohydrolysis of the organosilicon compound and one or more hydrolyzable silanes wherein any organic radicals bonded to silicon atoms are monovalent hydrocarbon or halogenated hydrocarbon radicals. Alternatively the copolymers may be obtained by equilibration of the hydrolysis product with cyclic siloxanes according to known procedures. This invention includes organosilicon polymers having the repeating unit ($OSiR_2 - C \equiv C C \equiv C SiR_2$) and copolymers of from 0.1 to 99.9 per cent by weight of such units and 99.9 to 0.1 per cent by weight of units of the formula $Q_aSiO_{(4-a)/2}$, wherein Q represents a monovalent hydrocarbon or halogenated hydrocarbon radical and $a$ has a value of 0, 1, 2 or 3. Q may be any desired monovalent hydrocarbon or halohydrocarbon radical e.g. alkyl, alkenyl, aryl, aralkyl, alkaryl, haloalkyl, and haloaryl. Preferably however the Q substitutents are selected from methyl, phenyl, vinyl and 3,3,3-trifluoropropyl radicals. The invention further includes cyclic organosilicon compounds of the general formula

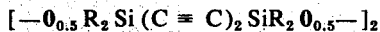

wherein R represents a monovalent hydrocarbon or halohydrocarbon radical. Such compounds may be obtained from the hydrolysis product of the compounds of this invention wherein m and n are each unity, R' and R'' are hydrolyzable and R is non-hydrolyzable by heating an organic solution of the said hydrolysis product to a temperature of from about 80° to 100° C.

The homopolymers may be converted to an insoluble cross-linked material on heating in the presence of any of the organometallic compounds known to oligomerize or polymerize acetylenes for example molybdenum hexacarbonyl or dicobalt octacarbonyl. When heated to a temperature of about 130°–140° C in the absence of the carbonyl compound the homopolymer in which the R radicals are methyl radicals has been found to convert to a light-brown glassy solid without significant change in molecular weight. On further heating to about 200° – 250° C a dark, glassy solvent-insoluble solid is obtained which on thermogravimetric analysis indicates an ability to withstand temperatures of at least 700°C without significant loss of weight or change of appearance. The polymers of this invention therefore find application as high temperature resistant laminating and moulding compounds and in the preparation of adhesives.

The following examples illustrate the invention.

EXAMPLE 1 n-butyl-lithium (17.2 g., 2 mol) in n-hexane (100 ml.) was added dropwise to a solution of diacetylene (6.73 g., 1 mol) in tetrahydrofuran (300 ml.) at −23° C with constant stirring. After the addition of n-butyl lithium was completed (one-half hour), the system was stirred for a further period of approximately 2 hr. and then slowly warmed to about 0° −5° C. N,N-dimethylamino(diamethylchloro)-silane (37.0 g., 2 mol) was then added dropwise and the reaction mixture was stirred for a further period of 6 – 8 hr. at room temperature. The solvents were removed at 20°/10 mm. and replaced by either (200 ml.). The precipitated lithium ohloride was filtered off and the filtrate on distillation afforded a white solid (33.9 g,. 72.2%) b.p. 82° – 85°0.05 mm. which was characterized as bis(N,N-dimethylamino-dimethylsily)diacetylene (Found: C, 56.1 H, 9.1; m/e 252 $C_{12}H_{24}N_2Si_2$ requires C, 57.1 H, 9.5% M 252). 'H NMR spectrum showed two singlets at 7.6 τ (N Me$_2$) and 9.6 τ (SiMe$_2$) integrated in the ratio of 1:1.

EXAMPLE 2 n-butyl lithium (12.8 g), diacetylene (5.0 g) and methoxydimethylchlorosilane (24.9 g.) were reacted by the method of Example 1. The product was bis(methoxydimethylsilyl) diacetylene (7.5 g.), b.p. 72°10.7 mm.

EXAMPLE 3

Employing the procedure of Example 1, n-butyl lithium (6.9 g.), diacetylene (2.7 g.) and dimethychlorosilane were employed to prepare bis (dimethylsilyl)diacetylene (5.9 g.) b.p. 73°/11 mm.

EXAMPLE 4

Dry HCl gas was slowly bubbled into a solution of bis(N,N-dimethyl-amino-dimethylsilyl)diacetylene (17.6 g.) in n-pentane (200 ml.) at approximately 10°. The passage of HCl gas was stopped after about 1 hour and the reaction mixture was filtered. The filtrate was concentrated at reduced pressure to afford a white crystalline solid (15.8 g., 96.3%) which was characterized as bis(dimethylchlorosilyl)diacetylene, b.p. 44° −46°/.05 mm. (Found: C, 40.1; H, 6.1; $C_8H_{12}Cl_2Si_2$ requires, C, 40.85; H, 5.1%.

'H NMR of the above compound showed only one singlet at 9.34 (SiMe$_2$).

EXAMPLE 5

Water (5 ml.,) was added to a solution of bis(dimethylchlorosilyl) di-acetylene (5.0 g.) in tetrahydrofuran (25 ml.) with constant stirring. An exothermic reaction ensued. The colorless reaction mixture was stirred overnight and then extracted with ether. The ether extract was concentrated under reduced pressure to afford a white powder (4.4.g.) which was characterized as H(OSiMe$_2$C $\equiv$ C − C $\equiv$ C SiMe$_2$)$_n$OH, m.p. 85°. (Found C, 53.3; H, 7.2., required C, 53.3; H, 6.67%).

The molecular weight of the product by Vapour Phase Osmometry was 2,350 and differential thermal analysis of the product showed a second order transition glass transition, at −32° and a sharp melting endotherm characteristic of a crystalline polymer, at +84°.

EXAMPLE 6

0.81 g., of the polymer prepared in Example 5 was heated to 135°C for 3 – 4 hr. A light-brown glassy solid was obtained with no appreciable change in molecular weight and negligible weight loss. The solid was further heated at 210°–230° for 2 - 3 hrs. to afford a hard dark reddish-brown solid, no appreciable loss in weight, occurring during the heating step. Thermogravimetric analysis carried out on this material showed negligible loss in weight up to 700°. Very little change in appearance of the polymer was observed.

EXAMPLE 7

0.70 g. of the polymer prepared in Example 5 and molybdenum carbonyl (0.1 g.) in heptane (7 ml.) gave a colorless solution at 60°. On further heating to 110° (one-half hour), the whole reaction mixture gelled to give a dark brown, insoluble mass.

EXAMPLE 8

1.4 -bis (dimethylchlorosilyl) diacetylene (27 g.) was stirred into a solution of water (10 ml.) in tetrahydrofuran (100 ml.) for 2 hours. Benzene (30 ml.) was then added and the THF/water/benzene azeotrope distilled off. The residue was dissolved in ether and dried over magnesium sulphate. White crystals separated which were isolated and shown by infra red, n.m.r., u.v. and mass spectral studies to be the cyclic compound $[-O_{0.5}(CH_3)_2Si(C\equiv C)_2Si(CH_3)_2O_{0.5}-]_2$ m.p. 214°C.

That which is claimed is:

1. Organosilicon compounds of the general formula $R'(R_2Si)_m(C\equiv C)-(C\equiv C)(SiR_2)_nR''$ wherein $R'$ and $R''$ each represent a radical of the formula $-NQ_2$ wherein each Q represents a hydrogen atom or a monovalent hydrocarbon radical having less than 19 carbon atoms, each R represents a monovalent hydrocarbon or halohydrocarbon radical, $m$ is 1, 2, 3 or 4 and $n$ is 1, 2, 3 or 4.

2. The compound bis(N,N-dimethylamino-dimethylsilyl)-diacetylene.

* * * * *